United States Patent [19]

Luke

[11] Patent Number: 5,530,249

[45] Date of Patent: Jun. 25, 1996

[54] ELECTRODE CONFIGURATION AND SIGNAL SUBTRACTION TECHNIQUE FOR SINGLE POLARITY CHARGE CARRIER SENSING IN IONIZATION DETECTORS

[75] Inventor: Paul Luke, Castro Valley, Calif.

[73] Assignee: The Regents of the University of California, Oakland, Calif.

[21] Appl. No.: 258,847

[22] Filed: Jun. 9, 1994

[51] Int. Cl.$^6$ .............................. G01T 1/185; G01T 1/24
[52] U.S. Cl. .................. 250/374; 250/370.13; 250/385.1
[58] Field of Search .......................... 250/385.1, 370.13, 250/374

[56] References Cited

FOREIGN PATENT DOCUMENTS 1481697  5/1989  U.S.S.R. .............................. 250/385.1

Primary Examiner—Constantine Hannaher
Attorney, Agent, or Firm—Paul R. Martin

[57] ABSTRACT

An ionization detector electrode and signal subtraction apparatus and method provides at least one first conductive trace formed onto the first surface of an ionization detector. The first surface opposes a second surface of the ionization detector. At least one second conductive trace is also formed on the first surface of the ionization detector in a substantially interlaced and symmetrical pattern with the at least one first conductive trace. Both of the traces are held at a voltage potential of a first polarity type. By forming the traces in a substantially interlaced and symmetric pattern, signals generated by a charge carrier are substantially of equal strength with respect to both of the traces. The only significant difference in measured signal strength occurs when the charge carrier moves to within close proximity of the traces and is received at the collecting trace. The measured signals are then subtracted and compared to quantitatively measure the magnitude of the charge and to determine the position at which the charge carrier originated within the ionization detector.

21 Claims, 5 Drawing Sheets

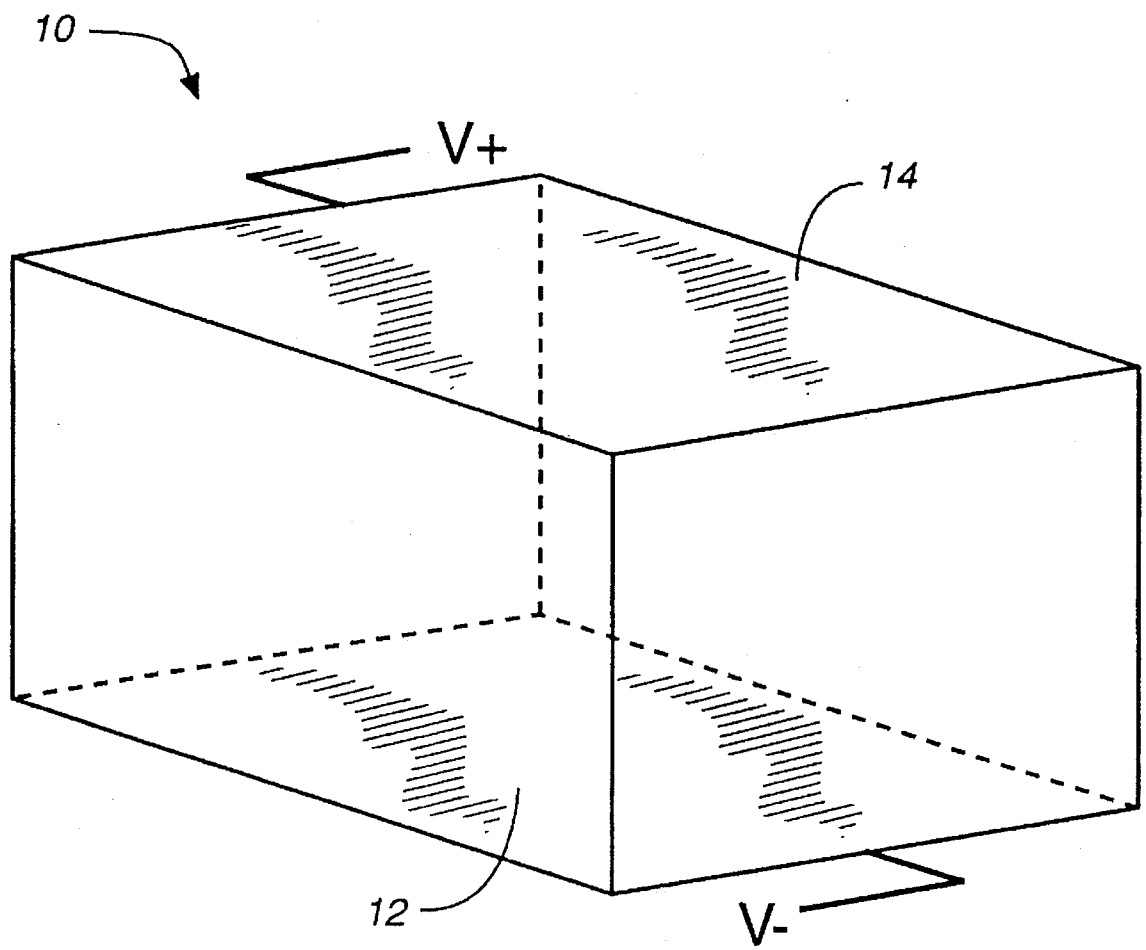
FIG._1 (PRIOR ART)

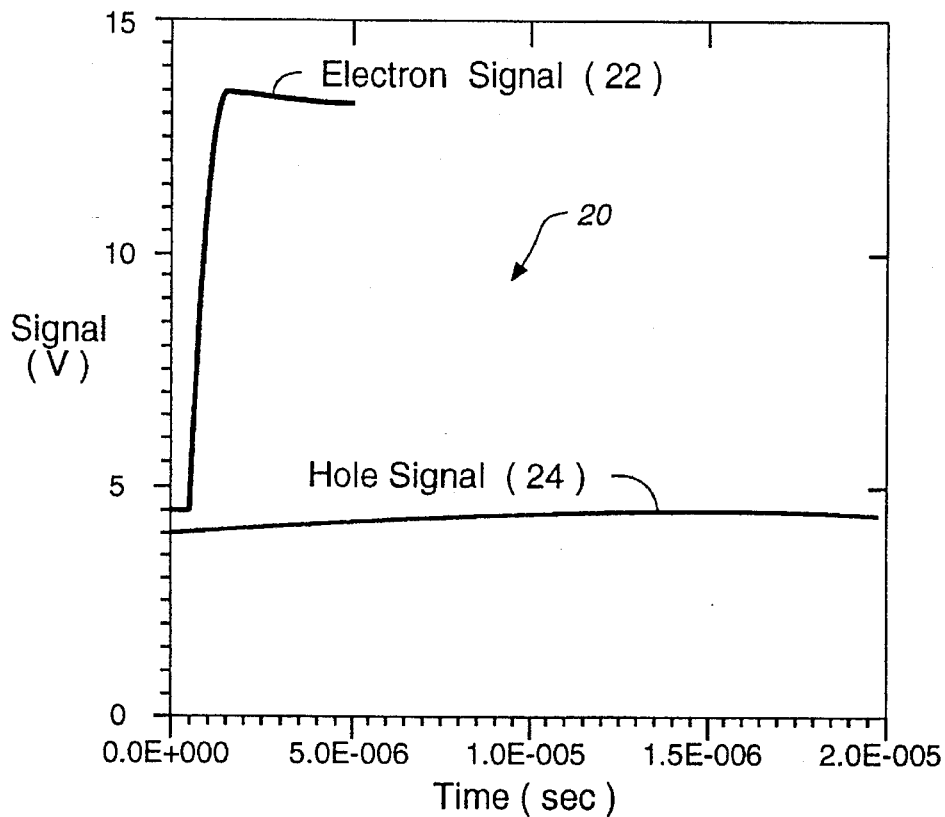
FIG._2 (PRIOR ART)
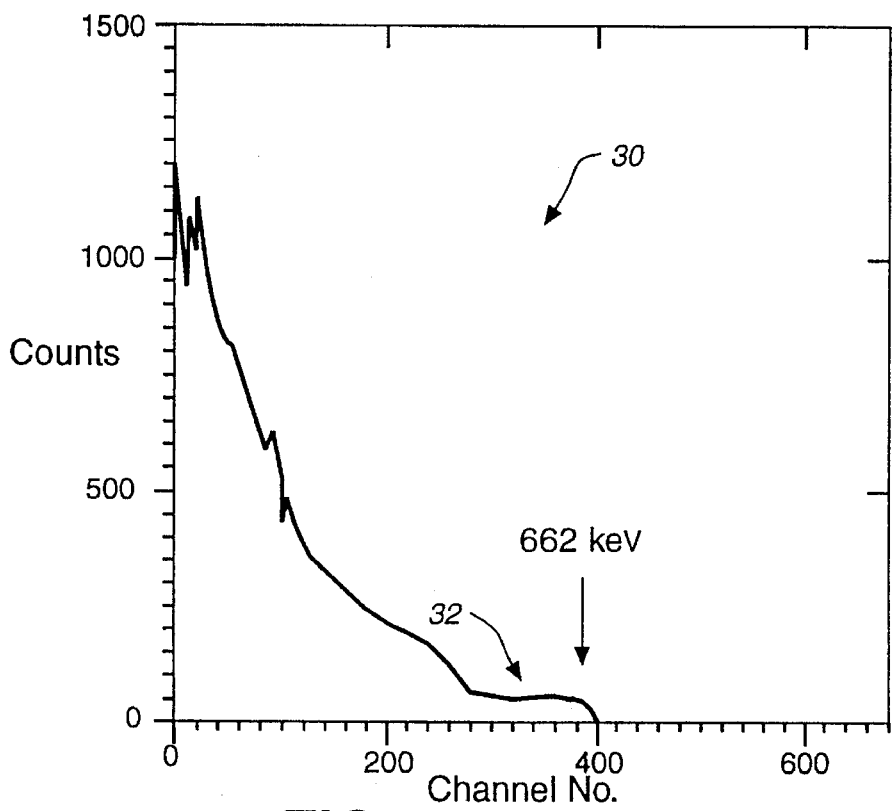
FIG._3 (PRIOR ART)

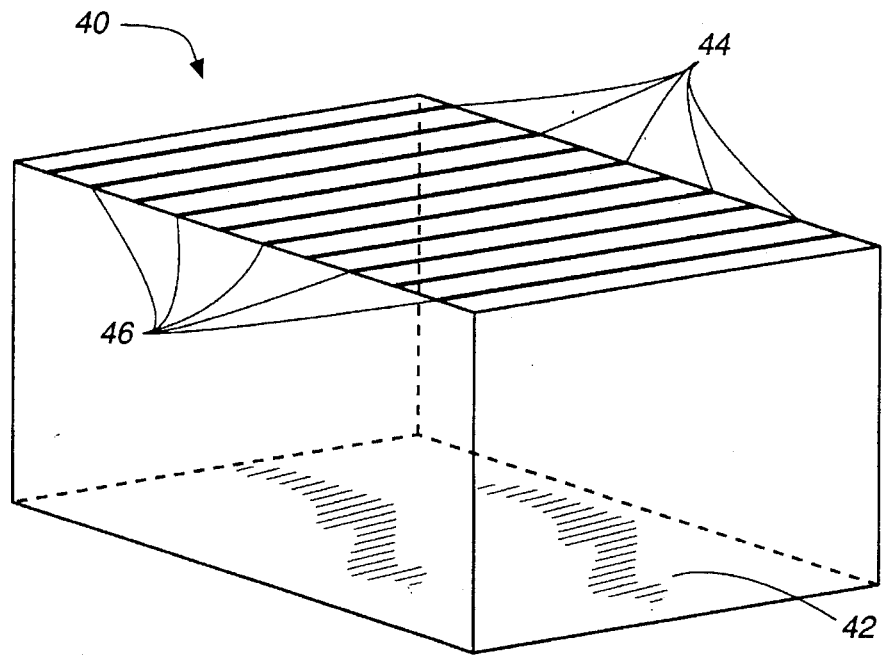
FIG._4
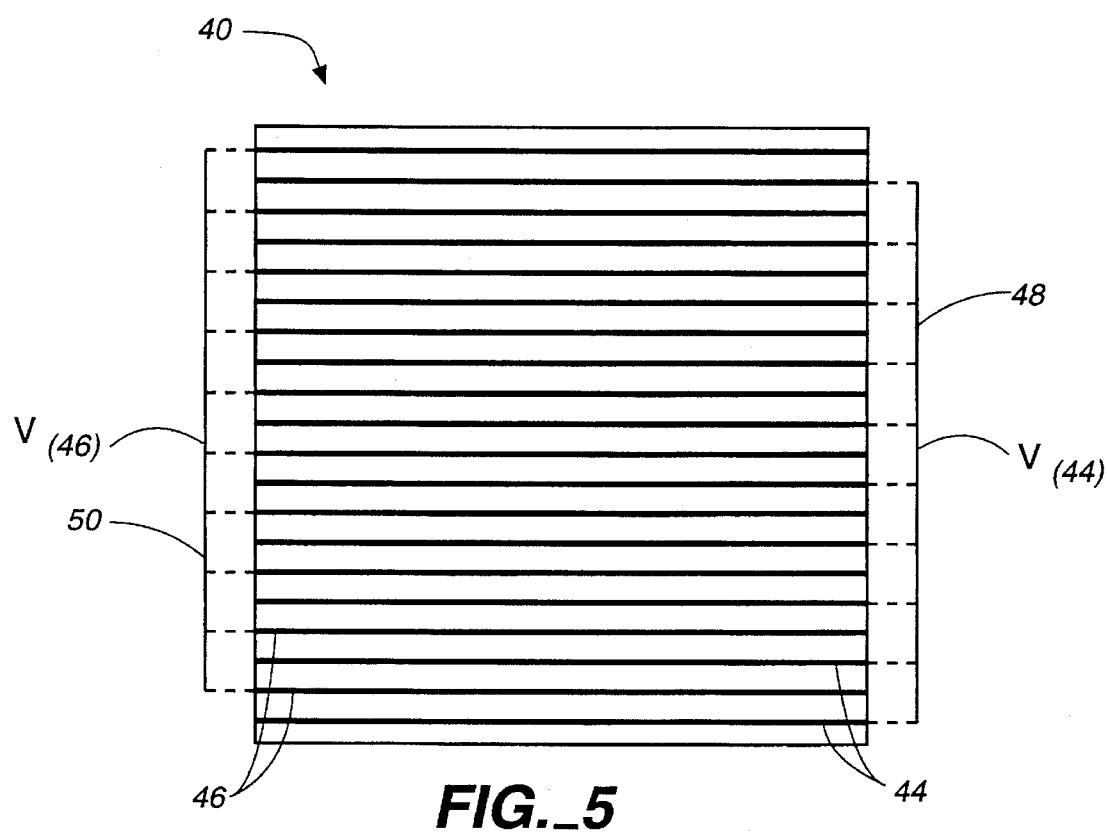
FIG._5

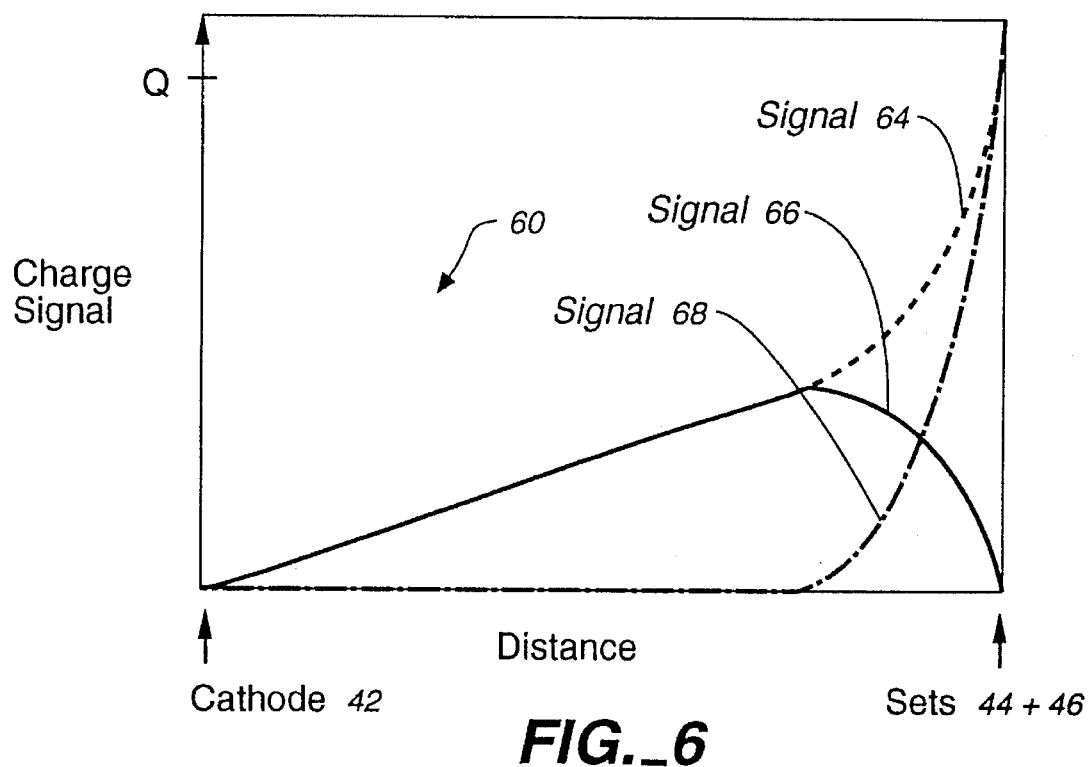
FIG._6
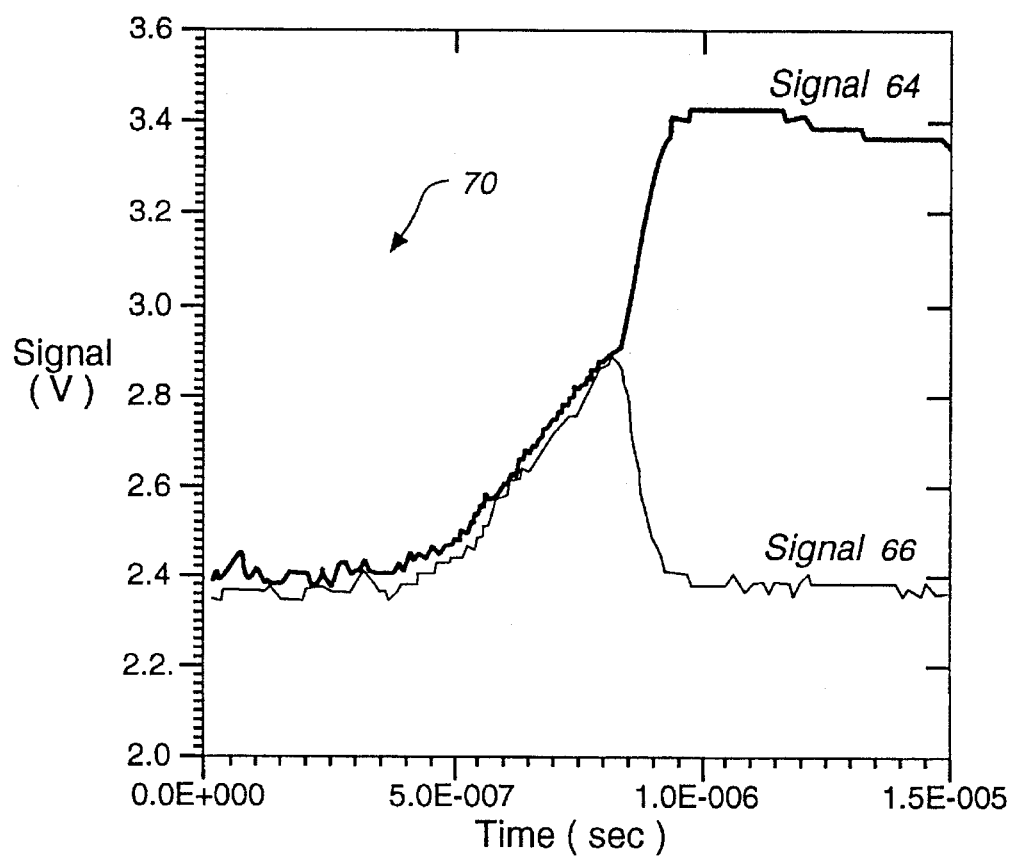
FIG._7

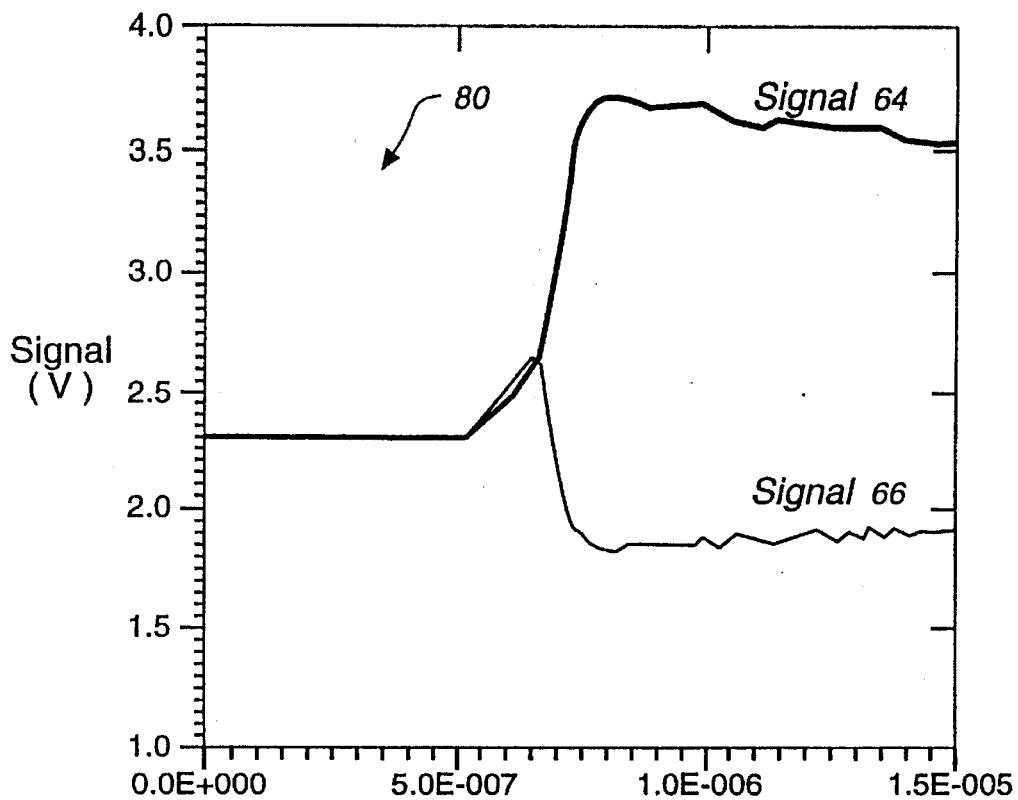
FIG._8
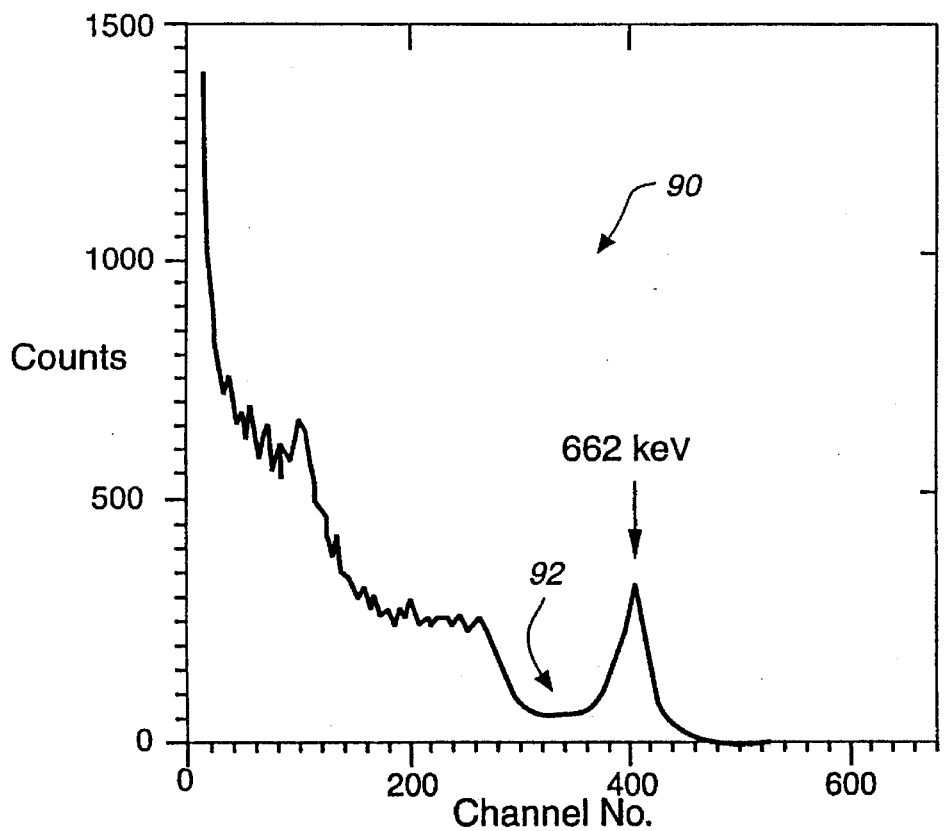
FIG._9

ELECTRODE CONFIGURATION AND SIGNAL SUBTRACTION TECHNIQUE FOR SINGLE POLARITY CHARGE CARRIER SENSING IN IONIZATION DETECTORS

GOVERNMENT RIGHTS

The United States Government has rights in this invention pursuant to Contract No. DE-ACO3-76SF00098 between the United States Department of Energy and the University of California.

TECHNICAL FIELD

The present invention relates to the field of radiation detection and, more specifically, to single polarity charge carrier sensing in ionization detectors.

BACKGROUND OF THE INVENTION

Radiation detectors using simple planar electrodes and which are based on ionization measurements often suffer from poor collection of charge carriers of certain polarity types. Such detectors include, for example, semiconductor detectors, liquid ionization detectors, and gas ionization detectors. The poor collection characteristics of these detectors can be due to such factors as intrinsic material properties, defects in the detector medium, or radiation damage. For example, in certain semiconductor detectors, positive charge carriers, holes, migrate through the detector medium at a much slower rate than the negative charge carriers, electrons. Additionally, in certain semiconductor detectors, holes are more likely to become trapped within the detector medium. As a result, such detectors produce signals that vary in amplitude depending upon the location within the detector at which incident radiation interacts with the detector medium.

Specifically, if incident radiation is absorbed very close to the cathode of a detector, generated holes need only travel a short distance before being collected at the cathode. Corresponding generated electrons must travel a much greater distance through the detector medium before being collected at the anode. In such an example, the rapid migration rate and good collection efficiency of the electrons allows the detector to produce a full amplitude signal. If, on the other hand, the incident radiation is absorbed very close to the anode of the detector, generated holes must travel through almost the entire length of the detector medium before being collected at the cathode. Corresponding generated electrons only travel a short distance before being collected at the anode. Due to the poor migration characteristics of the holes, a weak signal is generated thus resulting in a reduced signal amplitude. Variation in signal amplitude results in poor energy resolution.

In one attempt to overcome such position dependent signal amplitude variation problems, Frisch grids have been implemented in liquid and gas ionization detectors. Frisch grids provide for the sensing of only charge carriers of a single selected polarity. In so doing, problems such as poor migration characteristics of certain polarity charge carriers can be negated. A Frisch grid consists of a mesh-like electrode positioned within the liquid or gaseous detector medium in close proximity to the collecting electrode. A voltage potential opposite that of the selected charge carrier is applied to the Frisch grid. The magnitude of the voltage potential applied to the Frisch grid is less than the voltage potential applied to the collecting electrode. Signals are derived from carriers which pass between the grid and the adjacent end electrode. In so doing, such signals are not dependent upon the location at which the single polarity charge carriers are generated within the main detector volume. Additionally, when using a Frisch grid, the signal amplitude will depend only upon the collection of a charge carrier of a single polarity type.

However, Frisch grids are not without drawbacks. The use of Frisch grids may result in imperfect charge carrier transmission. That is, some of the charge carriers may not pass through the Frisch grid as desired but, instead, are "trapped" at the surface of the Frisch grid. Such trapped carriers lead to loss of signal strength and degraded resolution. Additionally, Frisch grids are not well suited for use in semiconductor ionization detectors.

In another attempt to alleviate position dependent signal amplitude variation problems, hemispherical electrodes have been used in semiconductor detectors. Although such electrodes have been found to achieve a certain degree of preferential single polarity charge carrier sensing, such a configuration renders detector fabrication extremely difficult. Furthermore, the use of hemispherical electrodes often results in the creation of a highly non-uniform electric field within the detector. In turn, the highly non-uniform electric field often prevents good charge collection.

Consequently, a need exists for an ionization detector suitable for single polarity charge carrier sensing which does not trap charge carriers, does not produce a highly non-uniform electric field within the ionization detector medium, does not dramatically increase ionization detector fabrication costs, which is suitable for use in semiconductor ionization detectors, and which does not suffer from position dependent signal amplitude variation problems.

SUMMARY OF THE INVENTION

It is therefore an object of the present invention to provide an ionization detector suitable for single polarity charge carrier sensing which does not trap charge carriers, does not produce a highly non-uniform electric field within the ionization detectors medium, does not dramatically increase ionization detector fabrication costs, which is suitable for use in semiconductor ionization detectors, and which does not suffer from position dependent signal amplitude variation problems. This object has been accomplished by an ionization detector employing a novel electrode configuration and signal subtraction technique. In the present invention, at least one first conductive trace and at least one second conductive trace are formed onto the first surface of an ionization detector in a substantially interlaced and symmetrical pattern. Both of the traces are held at a voltage potential of a polarity type opposite that of the charge carrier being sensed.

By forming the traces in a substantially interlaced and symmetric pattern, signals generated by a charge carrier are of substantially equal strength with respect to both of the traces until the charge carrier moves to within close proximity of the traces. The signals are measured at both of the traces and are then subtracted and compared to quantitatively measure the magnitude of the charge and to determine the position at which the charge carrier originated within the ionization detector.

In one embodiment of the present invention, each of the traces is formed of a respective plurality of parallel conductive strips. The plurality of parallel conductive strips extend across at least a portion of the first surface of the ionization detector. The first plurality of parallel conductive strips are arranged parallel to the second plurality of parallel conductive strips, with the first plurality of conductive strips interlaced with the second plurality of conductive strips such that each of the adjacent conductive parallel strips of the first conductive trace has a conductive parallel strip of the second conductive trace disposed therebetween. Thus, a "striped" pattern of parallel alternating first and second parallel conductive strips is formed across the top surface of the ionization detector.

In so doing, the present invention is able to quantitatively measure the magnitude of a charge carrier of a selected single polarity and determine the position at which the charge carrier originated within the ionization detector. Also, the present invention eliminates the need for the insertion of a mesh-like electrode into the detector medium, and avoids the problem of charge loss associated with Frisch grids. Furthermore, the present invention does not suffer from position dependent signal amplitude variation problems.

BRIEF DESCRIPTION OF THE DRAWINGS

The accompanying drawings which are incorporated in and form a part of this specification, illustrate embodiments of the invention and, together with the description, serve to explain the principles of the invention:

FIG. 1 is a perspective view of a Prior Art semiconductor ionization detector having a conventional electrode configuration formed thereon.

FIG. 2 is a graph of signal strength vs. time obtained using the conventional semiconductor ionization detector of Prior Art FIG. 1.

FIG. 3 shows an energy spectrum obtained from exposing the conventional detector of Prior Art FIG. 1 to 662 KeV gamma rays from a $^{137}$Cs source.

FIG. 4 is a perspective view of a semiconductor ionization detector having an electrode configuration in accordance with the present claimed invention.

FIG. 5 is a top view of the semiconductor ionization detector having an electrode configuration of FIG. 4 in accordance with the present claimed invention.

FIG. 6 is a simplified graph of charge signal vs. distance of a negative charge carrier from the electrode configuration of FIG. 4 in accordance with the present claimed invention.

FIG. 7 is an experimentally derived graph of signal strength vs. time measured using the electrode configuration of FIG. 4 wherein a negative charge carrier travels through almost the entire body of a detector in accordance with the present claimed invention.

FIG. 8 is an experimentally derived graph of signal strength vs. time measured using the electrode configuration of FIG. 4 wherein a negative charge carrier travels through only a portion of the body of a detector in accordance with the present claimed invention.

FIG. 9 shows an energy spectrum obtained from exposing the detector of FIG. 4 to 662 KeV gamma rays from a $^{137}$Cs source.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

With reference now to Prior Art FIG. 1, a semiconductor ionization detector 10 having a conventional electrode configuration formed thereon is shown. The conventional electrode configuration consists of full area electrodes, for example 5 mm×5 mm gold contacts, 12 and 14 deposited onto two opposing faces of a cubic semiconductor ionization detector 10. Detector 10 is formed of a semiconductor material such as, for example, silicon. Radiation absorbed within detector 10 creates negatively charged carriers, electrons, and an equal number of corresponding positively charged carriers, holes. When a voltage potential is applied across electrodes 12 and 14, electrons will drift toward the anode, positively biased electrode 14, and the holes will drift towards the cathode, negatively biased electrode 12. A charge-sensitive amplifier, not shown, is typically connected to one of electrodes 12 or 14 to measure the induced charge due to the movement of the charge carriers.

With reference still to Prior Art FIG. 1, detector 10 having a conventional electrode configuration, is exposed to an $^{241}$Am radiation source. The $^{241}$Am radiation source produces alpha particles having an energy of approximately 5 MeV. Those alpha particles travel only a very short distance through the semiconductor medium of conventional detector 10. Specifically, most alpha particles travel less than approximately 0.01 mm through conventional detector 10. As a result, charge carriers are generated very close to the incident surface of conventional detector 10. Thus, if an alpha particle enters through cathode 12, signals obtained are due to the collection of electrons which have traveled across the semiconductor medium of conventional detector 10 towards anode 14. Conversely, if an alpha particle enters through anode 14, signals are generated by the movement of holes towards cathode 12.

With reference next to Prior Art FIG. 2, a graph 20 of signal strength vs. time is shown. Graph 20 shows both a signal 22 obtained due to the migration of electrons toward anode 14 of Prior Art FIG. 1, and a signal 24 obtained due to the migration of holes toward cathode 12 of Prior Art FIG. 1. The bias voltage between cathode 12 and anode 14 was 400 V in both cases. As shown in graph 20, as indicated by the fast and linear rise of signal 22 electrons are collected rapidly and efficiently at anode 14. As the electrons reached anode 14, the signal levels off abruptly at an amplitude corresponding to the total amount of charge collected. On the other hand, hole signal 24 is very slow and only reaches a small fraction of the amplitude of electron signal 22. The large disparity in signal strength and rise time clearly demonstrates the vast difference in collection efficiencies for electrons and holes found in certain types of detectors. Furthermore, the poor hole collection efficiency strongly affects the performance of conventional detector 10 as a gamma-ray spectrometer for higher energy level incident radiation.

With reference next to Prior Art FIG. 3, an energy spectrum graph 30 obtained from exposing detector 10, having a conventional electrode configuration, of Prior Art FIG. 1 to 662 KeV gamma rays from a $^{137}$Cs source is shown. Unlike previously mentioned 5 MeV alpha particles, higher energy gamma rays are not strongly absorbed and, therefore, interact randomly throughout the entire volume of the detector. Thus, not all of the radiation interacts closely to the incident surface of conventional detector 10. As a result, gamma rays which interact close to cathode 12 of conventional detector 10 will give nearly full amplitude signals due to electron migration across detector 10. On the other hand, gamma rays which interact close to anode 14 will generate small signals since the electrons travel only a short distance through detector 10, and because very little contribution to signal strength is made by the holes. As a result, the energy spectrum of high-energy, mono-energetic gamma rays will consist of a broad continuum 32 extending from zero energy to the full energy 662 KeV.

With reference again to Prior Art FIG. 3, instead of well defined photo peaks, only step-like distributions with upper thresholds at the full gamma-ray energies can be seen in spectrum graph 30. The additional rise in the spectra toward low energies are due to Compton scattering in which gamma rays deposit part of their energy in the detector and then escape as a lower energy gamma rays. Significant background effects due to Compton scattering are expected due to the small size of conventional detector 10, but they are also distorted in graph 30 because of poor hole collection.

With reference now to FIG. 4, a perspective view of a semiconductor ionization detector 40 having an electrode configuration in accordance with the present invention is shown. In the present embodiment, detector 40 is a cube-shaped cadmium zinc telluride, CdZnTe, semiconductor ionization detector having a cathode 42 formed on one side thereof. Two independent and substantially interlaced sets 44 and 46 of conductive strip traces are formed in a substantially symmetric arrangement opposing cathode 42. Independent and substantially interlaced sets 44 and 46 function as an anode. Although independent and substantially interlaced sets 44 and 46 function as an anode in the present embodiment, the present invention is also well suited to having an anode formed on end of the detector, and having independent and substantially interlaced sets 44 and 46 function as a cathode.

With reference still to FIG. 4, in the present embodiment, sets 44 and 46 of substantially interlaced conductive strip traces were formed by gold evaporation through a shadow mask onto a surface of detector 40. Thus, the present invention can be fabricated using existing technologies and without dramatically increasing detector fabrication costs. Although, sets 44 and 46 were fabricated as set forth above, the present invention is also well suited to using other fabrication methods to form sets 44 and 46 of substantially interlaced conductive strip traces. Additionally, by forming sets 44 and 46 of conductive strip traces of the surface of detector 40, the present invention eliminates reflective charge loss associated with prior art Frisch grids. Furthermore, although the electrode configuration of the present invention is used in a cadmium zinc telluride semiconductor detector, the present invention is also well suited for use with, for example, other compound semiconductor detectors, semiconductor detectors, solid state detectors, and even liquid or gaseous ionization detectors. In liquid or gaseous ionization detectors, the interlaced and symmetric electrodes would be formed on one of the opposing faces of the liquid or gaseous detectors.

With reference again to FIG. 4, the present invention uses a novel electrode structure and signal subtraction technique to obtain signals whose strength and signal amplitude variation is not position dependent. That is, the magnitude of measured signals does not vary significantly regardless of where the collected charge carrier is generated within the detector. Furthermore, even when only charge carriers of one polarity type are collected, the position of charge generation within the detector does not affect signal strength.

With reference next to FIG. 5, a top view of the electrode configuration of the embodiment of FIG. 4 is shown. In the present embodiment, conductive strip traces 44 and 46 extend across an entire surface of detector 40. FIG. 5 shows an electrical terminal 48 which provides a common electrical terminal to which all of the strips 44 are commonly connected. Similarly, FIG. 5 shows another electrical terminal 50 which provides a common terminal to which all of the conductive traces 46 are commonly connected. The electrical terminals 48 and 50 are made off to the side of the surface of detector 40, so that a symmetric pattern of conductive strip traces is formed on detector 40. Although a pattern of two, alternating sets of parallel conductive strip traces is used in the present embodiment, the present invention is well suited to numerous other conductive strip trace configurations.

With reference again to FIG. 5, a description of the operation of the present invention is given. A voltage potential $V_{(44)}$ and $V_{(46)}$ of positive polarity is applied to respective terminals 48 and 50 for sets 44 and 46, respectively. A relatively uniform electric field is generated inside semiconductor detector 40 by applying a potential of negative polarity to opposing cathode 42. As a result, in the present embodiment negative charge carriers drift towards sets 44 and 46 of conductive strip traces. When a negative charge carrier drifts from cathode 42 towards the sets 44 and 46 of conductive strip traces, an increasing charge signal is induced separately on set 44 and set 46. For most of the distance traveled by the negative charge carrier, the signals induced at sets 44 and 46 are almost identical. The two signals will only deviate significantly from each other when the negative charge carrier drifts to within close proximity of sets 44 and 46 when making its final approach to the collecting conductive strip trace of either set. By making the pitch of the conductive strip traces of sets 44 and 46 small compared to the thickness of detector 40, the difference between signals obtained at sets 44 and 46 will be extremely small for almost the entire volume of detector 40.

With reference next to FIG. 6, a simplified graph 60 of charge signal vs. distance of the charge carrier from sets 44 and 46 is shown. If the negative carrier is collected at a conductive strip trace of set 44, the charge signal 64 induced at set 44 will rise to a final value equal to the charge of the carrier, while the signal 66 induced at set 46 will return to zero. Therefore, by subtracting one signal from the other, for example signal 64 minus signal 66, the response to the initial movement of the negative charge carrier is canceled out. As shown in simplified graph 60, a difference signal 68, signal 64-signal 66, is only developed when the negative charge carrier is drifting to within a small distance from the collecting conductive strip trace of either set. That is, signal 68 has a zero value until the negative charge carrier closely approaches sets 44 and 46. As a result, difference signal 68 is generated mainly due to the collection of charge carriers of a single polarity type. That is, the signal amplitude variation of detector 40 is not dependent upon the location at which charge carriers are generated over most of the volume of detector 40.

With reference again to FIG. 6, by generating signals based upon the collection of negative charge carriers, the present invention greatly diminishes the effect of incomplete collection of charge carriers of the opposite polarity type. Additionally, in the present embodiment, the magnitude of voltage potential $V_{(44)}$ applied to set 44 is 25 volts greater than the magnitude of the voltage potential. $V_{(46)}$ applied to set 46. In so doing, all negative charge carriers are collected at set 44. Therefore, signal amplitude is not reduced as collection of charge carriers occurs only at set 44. As a result, the polarity of difference signal 68 remains constantly positive. By having difference signal 68 with a fixed polarity, signal processing in the present invention is simplified. The present invention is also well suited to having the magnitude of voltage potential $V_{(46)}$ greater than the magnitude of the voltage potential $V_{(44)}$. Likewise, the present invention is also well suited to using larger or smaller voltage potential differences between $V_{(46)}$ and $V_{(44)}$.

With reference next to FIG. 7, an experimentally derived graph 70 of signal strength vs. time as measured at both of sets 44 and 46 of FIG. 4 is shown. Signals from sets 44 and 46 of conductive strip traces were captured simultaneously while detector 40 was being irradiated with 662 KeV gamma rays. Experimentally derived graph 70 illustrates measured signals obtained for a gamma ray photon absorbed close to cathode 42 such that the negative charge carriers travel across the full thickness of detector 40 until finally being collected at set 44. As shown in graph 70, the signals obtained at sets 44 and 46 were the same until the negative charge carriers were within close proximity to the conductive strip traces of sets 44 and 46. After traveling to within close proximity of conductive strip traces of sets 44 and 46 and being collected at set 44, signal 64 measured at set 44 increased to a value which represents the total charge of the negative charge carriers. Signal 66, on the other hand, measured at set 44 returned to its original or "zero" value after the negative charge carriers were collected at a conductive strip trace of set 44.

With reference again to FIG. 7, because signal 66 returns to its original or zero value, the amplitude of signal 64 corresponds to the total charge of the negative charge carriers collected at set 44. However, if a gamma ray photon is absorbed close to sets 44 and 46 the negative charge carriers travel only a short distance before being collected at set 44. In such a case, signal 66 will not return to its initial value, and signal 64 will not directly represent the total charge of the negative charge carrier.

With reference next to FIG. 8, an experimentally derived graph 80 of signal strength vs. time as measured at both of sots 44 and 46 of FIG. 4 is shown. As in FIG. 7, signals from sets 44 and 46 of conductive strip traces were captured simultaneously while detector 40 was being irradiated with 662 KeV gamma rays. However, experimentally derived graph 80 illustrates measured signals obtained for a gamma ray photon absorbed near the middle of detector 40 such that the negative charge carriers travel only a short distance through detector 40 before being collected at set 44. In this case, signals 64 and 66 start when the negative charge carriers are already at the middle of detector 40. Since the negative charge carriers travel a shorter distance, signal 64 measured at set 44 does not rise to full amplitude. On the other hand, signal 66 measured at set 46 becomes negative, or reaches a value lower than its initial or zero value. In such a case, the amplitude of difference between signals 64 and 66 corresponds to the total charge on the negative charge carriers. A simple difference amplifier can be used to perform the subtraction calculation on signals 64 and 66.

With reference again to FIG. 8, in addition to quantitatively measuring the total charge of the negative charge carriers, the present invention is also able to precisely determine the location within detector 40 of FIG. 4 at which the negative charge carriers originated. Specifically, by comparing the absolute value of the final amplitude of signal 66 to the amplitude of the difference of signals 64 and 66, a ratio is obtained which directly relates to the position of charge origination within detector 40. For example, if the negative charge carriers originate very close to cathode 42 as shown in FIG. 7, the final amplitude of signal 64 will be very close to zero. Thus, the above described ratio will approach zero. If, on the other hand, the negative charge carriers originate very near sets 44 and 46, the absolute value of the final amplitude of signal 66 will be very close to ½ the total charge of the, negative charge carriers and the ratio will approach ½. Therefore, the ratio will vary linearly from a minimum value of 0, corresponding to charge carrier origination at cathode 42, to a maximum value of ½, corresponding to charge carrier origination at sets 44 and 46. Thus, by calculating the above described ratio, the position of charge origination between cathode 42 and sets 44 and 46 is determined. Such quantitative position determination is particularly well suited to detectors in which charge carriers of one polarity type are not well collected.

With reference next to FIG. 9, an energy spectrum graph 90 obtained from exposing detector 40 to 662 KeV gamma rays from a $^{137}$Cs source is shown. A well defined spectrum 92 of graph 90 was developed under the same conditions use to obtain the poor quality spectrum 32 of Prior Art FIG. 3. As shown in FIG. 9, the present invention provides substantial improvement in energy resolution over the prior art. Specifically, detector 40 having sets 44 and 46 of conductive strip traces and employing the above described subtraction technique provides a clear full energy photo peak corresponding to the energy of the $^{137}$Cs gamma rays. Prior art detectors with conventional electrode configurations provide only broad continuum as shown in Prior Art FIG. 3. Also, using the present invention, the Compton backgrounds displayed the "correct" distributions whereas the Compton background distributions were distorted in Prior Art FIG. 3.

Several additional benefits are provided by the present invention. By enhancing the performance of ionization detectors, the performance of room temperature semiconductor detectors can be brought close to that of cryogenic Ge detectors. In so doing, the need for expensive cooling systems can be eliminated. As a result of the vastly improved energy resolution, the present invention could have a positive impact in many areas including, for example radioactive waste management, environmental monitoring material analysis, nuclear medicine, nuclear physics, and gamma-ray astronomy. The present invention can also be used to reduce the effect of radiation damage in semiconductor detectors such as for example, germanium detectors. Additionally, the present invention can also be used to determine the time of arrival of the charge carriers at the collecting trace. Furthermore, the present invention can also be employed, for example, in time of flight spectrometers.

Thus, the electrode configuration of the present invention can be readily formed onto the surface of semiconductor ionization detectors. The present invention also provides for single polarity charge carrier sensing ionization detectors including planar semiconductor detectors while achieving uniform electric field distributions within the ionization detector medium. As a result, the present invention achieves in a large improvement in the energy resolution of semiconductor detectors, especially compound semiconductor detectors which can be operated at room temperature but currently have poor energy resolution because of the inefficient collection of the positive carriers. This invention also simplifies the fabrication of gas and liquid ionization detectors by eliminating the need for a separate gridded Frisch electrode. Furthermore, the present invention eliminates position dependent signal amplitude variation problems associated with the prior art.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An ionization detector electrode configuration comprising:

at least one first conductive trace disposed on a first surface of an ionization detector, said at least one first conductive trace having a voltage potential of a first polarity type applied thereto, said first surface disposed opposing a second surface of said ionization detector wherein said second surface has disposed thereon an electrode, said electrode having a voltage potential of a second polarity type applied thereto, and at least one second conductive trace disposed on said first surface of said ionization detector, said at least one second conductive trace having a voltage potential of said first polarity type applied thereto, said at least one first and second conductive traces positioned on said first surface of said ionization detector in a substantially interlaced and symmetrical pattern such that signals generated by at least one charge carrier of said second polarity type moving within said ionization detector between said first and second surfaces towards said at least one first and second conductive traces are of substantially equal strength with respect to both of said at least one first and second conductive traces until said at least one charge carrier moves to within close proximity of said at least one first and second conductive traces;

wherein said at least one first and second conductive traces are comprised of a respective first plurality of commonly-connected parallel conductive strips and a second plurality of commonly-connected parallel conductive strips, said first and second plurality of commonly-connected parallel conductive strips extending across at least a portion of said first surface of said ionization detector, said first plurality of commonly-connected parallel conductive strips arranged parallel to said second plurality of commonly-connected parallel conductive strips, said first plurality of commonly-connected conductive strips interlaced with said second plurality of commonly-connected conductive strips such that adjacent at least one first conductive parallel strips have a second conductive parallel strip disposed therebetween.

2. The ionization detector electrode configuration of claim 1 wherein said at least one first and second conductive traces disposed on said first surface of an ionization detector are disposed on the first surface of a semiconductor ionization detector.

3. The ionization detector electrode configuration of claim 1 wherein said at least one first and second conductive traces disposed on said first surface of an ionization detector are disposed on the first surface of a compound semiconductor ionization detector.

4. The ionization detector electrode configuration of claim 1 wherein said at least one first and second conductive traces disposed on said first surface of an ionization detector are disposed on the first surface of a solid state ionization detector.

5. The ionization detector electrode configuration of claim 1 wherein said at least one first and second conductive traces disposed on said first surface of an ionization detector are disposed on the first surface of a gas ionization detector.

6. The ionization detector electrode configuration of claim 1 wherein said at least one first and second conductive traces disposed on said first surface of an ionization detector are disposed on the first surface of a liquid ionization detector.

7. The ionization detector electrode configuration of claim 1 wherein the dimensions of said at least one first and second conductive traces and the distance separating said first and second at least one conductive traces is small compared to the distance between said first and second surfaces of said ionization detector.

8. A method for single polarity charge detection in an ionization detector comprising the steps of:

forming at least one first conductive trace on a first surface of an ionization detector wherein said first surface is disposed opposing a second surface of said ionization detector, forming at least one second conductive trace on said first surface of said ionization detector in a substantially interlaced and symmetrical pattern with said at least one first conductive trace such that signals generated by at least one charge carrier of a first polarity type moving within said ionization detector between said first and second surfaces towards said at least one first and second conductive traces are substantially of equal strength with respect to both of said at least one first and second conductive traces until said at least one charge carrier of said first polarity type moves to within close proximity of said at least one first and second conductive traces, forming an electrode on said second surface of said ionization detector, applying a first voltage potential of a second polarity type to said at least one first conductive trace, applying a second voltage potential of said second polarity type to said at least one second conductive trace, applying a voltage potential of said first polarity type to said electrode, and measuring at both of said at least one first and second conductive traces said signals generated by said at least one charge carrier moving within said detector between said first and second surfaces;

wherein said steps of forming at least one first and second conductive traces on said first surface of said ionization detector in a substantially interlaced and symmetrical pattern further comprise the steps of:

forming a respective first plurality of parallel commonly-connected conductive strips and a second plurality of parallel commonly-connected conductive strips with said first and second plurality of parallel commonly-connected conductive strips extending across at least a portion of said first surface of said ionization detector, and arranging said first plurality of parallel commonly-connected conductive strips parallel to said second plurality of parallel commonly-connected conductive strips and interlacing said first plurality of commonly-connected conductive strips with said second plurality of commonly-connected conductive strips such that adjacent at least one first conductive parallel strips have a second conductive parallel strip disposed therebetween.

9. The method as recited in claim 8 wherein said steps of forming at least one first and second conductive traces on said first surface of an ionization detector further comprise forming said at least one first and second conductive traces on the first surface of a semiconductor ionization detector.

10. The method as recited in claim 8 wherein said steps of forming at least one first and second conductive traces on said first surface of an ionization detector further comprise forming said at least one first and second conductive traces on the first surface of a compound semiconductor ionization detector.

11. The method as recited in claim 8 wherein said steps of forming at least one first and second conductive traces on said first surface of an ionization detector further comprise forming said at least one first and second conductive traces on the first surface of a solid state ionization detector.

12. The method as recited in claim 8 wherein said steps of forming at least one first and second conductive traces on said first surface of an ionization detector further comprise forming said at least one first and second conductive traces on the first surface of a gas ionization detector.

13. The method as recited in claim 8 wherein said steps of forming at least one first and second conductive traces on said first surface of an ionization detector further comprise forming said at least one first and second conductive traces on the first surface of a liquid ionization detector.

14. The method as recited in claim 8 wherein the step of measuring said signals generated by said at least one charge carrier further comprises the steps of:

measuring at said at least one first conductive trace said signal generated by movement of said at least one charge carrier towards said first surface of said ionization detector until said at least one charge carrier is collected at either of said at least one first and second conductive traces, measuring at said at least one second conductive trace said signal generated by movement of said at least one charge carrier towards said first surface of said ionization detector until said at least one charge carrier is collected at either of said at least one first and second conductive traces, and subtracting said signal measured at said at least one second conductive trace from said signal measured at said at least one first conductive trace such that the magnitude of said at least one charge carrier is quantitatively determined.

15. The method as recited in claim 14 wherein the step of measuring said signals generated by said at least one charge carrier further comprises the steps of:

comparing the amplitude of said signal measured at the non-collecting at least one conductive trace with the amplitude of the difference between said signal measured at the collecting at least one conductive trace and said signal measured at said non-collecting said at least one conductive trace such that the position at which said at least one charge carrier originated within said ionization detector is quantitatively determined.

16. An ionization detector comprising:

at least one first conductive trace disposed on a first surface of an ionization detector wherein said first surface is disposed opposing a second surface of said ionization detector, an electrode disposed on said second surface of said ionization detector, at least one second conductive trace disposed on said first surface of said detector in a substantially interlaced and symmetrical pattern with said at least one first conductive trace such that signals generated by at least one charge carrier of a first polarity type moving within said detector between said first and second surfaces towards said at least one first and second conductive traces are substantially of equal strength with respect to both of said at least one first and second conductive traces until said at least one charge carrier of said first polarity type moves to within close proximity of said at least one first and second conductive traces, first voltage potential means applying a first voltage potential of a second polarity type to said at least one first conductive trace, second voltage potential means applying a second voltage potential of said second polarity type to said at least one second conductive trace, third voltage potential means applying a voltage potential of said first polarity type to said electrode, and signal measurement means measuring at both of said at least one first and second conductive traces said signals generated by said at least one charge carrier moving within said ionization detector between said first and second surfaces;

wherein said at least one first and second conductive traces are further comprised of a respective first plurality of parallel commonly-connected conductive strips and a second plurality of parallel commonly-connected conductive strips, said first and second plurality of parallel commonly-connected conductive strips extending across at least a portion of said first surface of said ionization detector, said first plurality of parallel commonly-connected conductive strips arranged parallel to said second plurality of parallel conductive strips, said first plurality of conductive strips interlaced with said second plurality of conductive strips such that adjacent at least one first conductive parallel strips have a second conductive parallel strip disposed therebetween.

17. An ionization detector electrode configuration comprising:

at least one first conductive trace disposed on a first surface of an ionization detector, said at least one first conductive trace having a voltage potential of a first polarity type applied thereto, at least one second conductive trace disposed on said first surface of said detector in a substantially interlaced and symmetrical pattern with said at least one first conductive trace such that signals generated by at least one charge carrier of a first polarity type moving within said detector between said first and second surfaces towards said at least one first and second conductive traces are substantially of equal strength with respect to both of said at least one first and second conductive traces until said at least one charge carrier of said first polarity type moves to within close proximity of said at least one first and second conductive traces, said first surface disposed opposing a second surface of said ionization detector wherein said second surface has disposed thereon an electrode, said electrode having a voltage potential of a second polarity type applied thereto wherein the magnitude of said voltage potential applied to said at least one first conductive trace is different from the magnitude of said voltage potential applied to said at least one second conductive trace.

18. A method for single polarity charge detection in an ionization detector comprising the steps of:

forming at least one first conductive trace on a first surface of an ionization detector wherein said first surface is disposed opposing a second surface of said ionization detector, forming at least one second conductive trace on said first surface of said ionization detector in a substantially interlaced and symmetrical pattern with said at least one first conductive trace such that signals generated by at least one charge carrier of a first polarity type moving within said ionization detector between said first and second surfaces towards said at least one first and second conductive traces are substantially of equal strength with respect to both of said at least one first and second conductive traces until said at least one charge carrier of said first polarity type moves to within close proximity of said at least one first and second conductive traces, forming an electrode on said second surface of said ionization detector, applying a first voltage potential of a second polarity type to said at least one first conductive trace, applying a second voltage potential of said second polarity type to said at least one second conductive trace, applying a voltage potential of said first polarity type to said electrode, and measuring at both of said at least one first and second conductive traces said signals generated by said at least one charge carrier moving within said detector between said first and second surfaces;

wherein said steps of applying a voltage potential to said first and second conductive traces comprises the steps of:

applying said first voltage potential of said second polarity type having a first magnitude to said at least one first conductive trace, and applying said second voltage potential of said second polarity type having a second magnitude to said at least one second conductive trace wherein said first magnitude of said first voltage potential is greater than said second magnitude of said second voltage potential.

19. The method as recited in claim 18 wherein the step of measuring said signals generated by said at least one charge carrier further comprises the steps of:

measuring at said at least one first conductive trace said signal generated by movement of said at least one charge carrier towards said first surface of said ionization detector until said at least one charge carrier contacts said at least one first conductive trace, measuring at said at least one second conductive trace said signal generated by movement of said at least one charge carrier towards said first surface of said ionization detector until said at least one charge carrier contacts said at least one first conductive trace, and determining the magnitude of said at least one charge carrier by subtracting said signal measured at said at least one second conductive trace from said signal measured at said at least one first conductive trace.

20. The method as recited in claim 18 wherein the step of measuring said signals generated by said at least one charge carrier further comprises the steps of:

comparing the amplitude of said signal measured at said at least one second conductive trace with the amplitude of the difference between said signal measured at said at least one first conductive trace and said signal measured at said at least one second conductive trace such that the position at which said at least one charge carrier originated within said ionization detector is quantitatively determined.

21. An ionization detector comprising:

at least one first conductive trace disposed on a first surface of an ionization detector wherein said first surface is disposed opposing a second surface of said ionization detector, an electrode disposed on said second surface of said ionization detector, at least one second conductive trace disposed on said first surface of said detector in a substantially interlaced and symmetrical pattern with said at least one first conductive trace such that signals generated by at least one charge carrier of a first polarity type moving within said detector between said first and second surfaces towards said at least one first and second conductive traces are substantially of equal strength with respect to both of said at least one first and second conductive traces until said at least one charge carrier of said first polarity type moves to within close proximity of said at least one first and second conductive traces, first voltage potential means applying a first voltage potential of a second polarity type to said at least one first conductive trace, second voltage potential means applying a second voltage potential of said second polarity type to said at least one second conductive trace, third voltage potential means applying a voltage potential of said first polarity type to said electrode, and signal measurement means measuring at both of said at least one first and second conductive traces said signals generated by said at least one charge carrier moving within said ionization detector between said first and second comparator means for comparing the amplitude of said signal measured at said at least one second conductive trace with the amplitude of the difference between said signal measured at said at least one first conductive trace and said signal measured at said at least one second conductive trace such that the position at which said at least one charge carrier originated within said ionization detector is quantitatively determined.

* * * * *